US012533886B2

(12) United States Patent
Suzuki

(10) Patent No.: US 12,533,886 B2
(45) Date of Patent: Jan. 27, 2026

(54) WIPING DEVICE AND LIQUID DISCHARGE APPARATUS

(71) Applicant: Hideaki Suzuki, Kanagawa (JP)

(72) Inventor: Hideaki Suzuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 149 days.

(21) Appl. No.: 18/600,807

(22) Filed: Mar. 11, 2024

(65) Prior Publication Data

US 2024/0326439 A1 Oct. 3, 2024

(30) Foreign Application Priority Data

Mar. 27, 2023 (JP) ................................ 2023-049342

(51) Int. Cl.
*B41J 2/165* (2006.01)

(52) U.S. Cl.
CPC ....... *B41J 2/16535* (2013.01); *B41J 2/16552* (2013.01); *B41J 2002/16558* (2013.01)

(58) Field of Classification Search
CPC ................ B41J 2/16535; B41J 2/16552; B41J 2002/16558
See application file for complete search history.

(56) References Cited

U.S. PATENT DOCUMENTS

| | | | | |
|---|---|---|---|---|
| 2019/0283431 | A1 | 9/2019 | Kikuchi | |
| 2024/0001680 | A1 * | 1/2024 | Ito | C09D 11/322 |

FOREIGN PATENT DOCUMENTS

| | | | | | |
|---|---|---|---|---|---|
| JP | 2011-212876 | A | | 10/2011 | |
| JP | 2012-040693 | A | | 3/2012 | |
| JP | 2012-171345 | A | | 9/2012 | |
| JP | 2014-015021 | A | | 1/2014 | |
| JP | 2014065227 | A | * | 4/2014 | |
| JP | 2015039781 | A | * | 3/2015 | B41J 2/16552 |
| JP | 2017-148971 | A | | 8/2017 | |
| JP | 2019-162862 | A | | 9/2019 | |

* cited by examiner

*Primary Examiner* — Sharon Polk
(74) *Attorney, Agent, or Firm* — XSENSUS LLP

(57) ABSTRACT

A wiping device includes a wiper to wipe a first head to discharge a first liquid with a first portion of the wiper; and wipe a second head to discharge a second liquid different from the first liquid with a second portion of the wiper different from the first portion; a first cleaning tank containing a first cleaning liquid to remove the first liquid attached to the first portion of the wiper; and a second cleaning tank containing a second cleaning liquid to remove the second liquid attached to the second portion of the wiper.

9 Claims, 9 Drawing Sheets

WIPING DEVICE AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2023-049342, filed on Mar. 27, 2023, in the Japan Patent Office, the entire disclosure of which is hereby incorporated by reference herein.

BACKGROUND

Technical Field

Embodiments of the present disclosure relate to a wiping device and a liquid discharge apparatus.

Related Art

A head that discharges liquid from a nozzle is provided with a maintenance and recovery mechanism (head maintenance device) including a cap that caps a nozzle surface of the head and a wiping device that wipes and cleans the nozzle surface in order to maintain and recover the state of the nozzle.

SUMMARY

An embodiment of the present disclosure provides a wiping device including a wiper to: wipe a first head to discharge a first liquid with a first portion of the wiper; and wipe a second head to discharge a second liquid different from the first liquid with a second portion of the wiper different from the first portion; a first cleaning tank containing a first cleaning liquid to remove the first liquid attached to the first portion of the wiper; and a second cleaning tank containing a second cleaning liquid to remove the second liquid attached to the second portion of the wiper.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
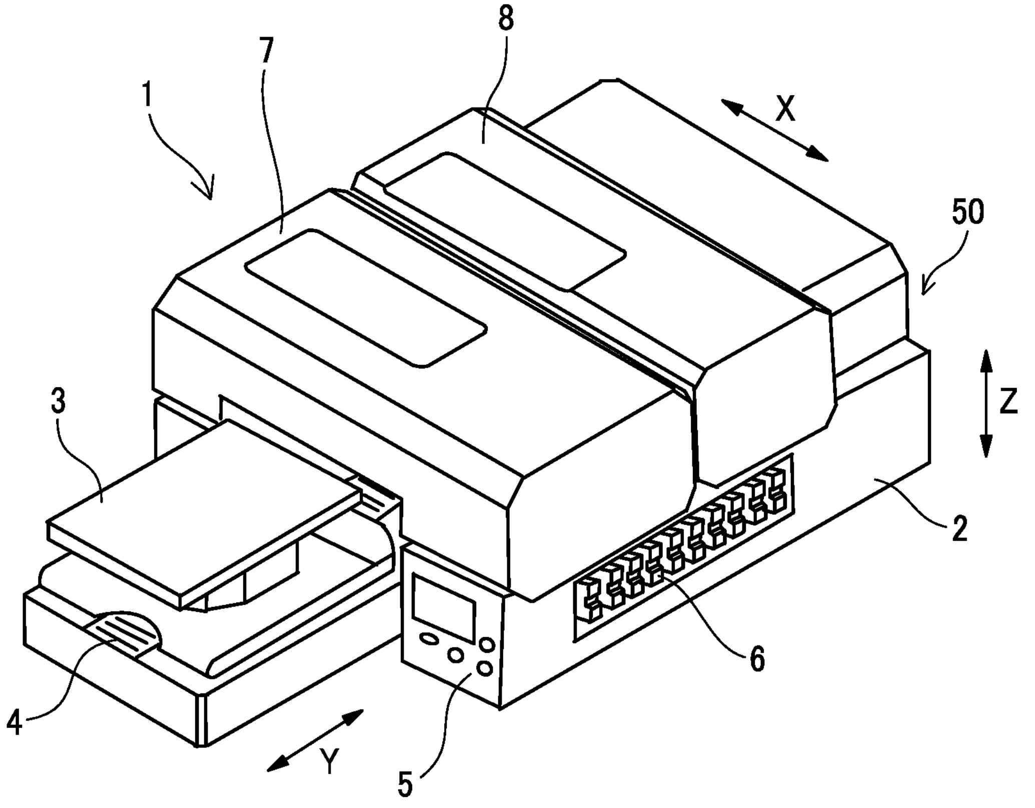
FIG. 1 is a perspective view of a printer as a liquid discharge apparatus with its covers closed, according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

An apparatus is known for moving a blade in a circular motion to wipe the nozzle surface of the head and then immersing the blade in a cleaning liquid for cleaning after wiping.

However, such a configuration, when the same wiper is used for wiping the heads discharging different liquids, might lead to the mixing and turbidity of these liquids in the cleaning liquids.

According to one aspect of the present disclosure, the turbidity of different liquids in a cleaning liquid is reduced or prevented.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Figure 2:
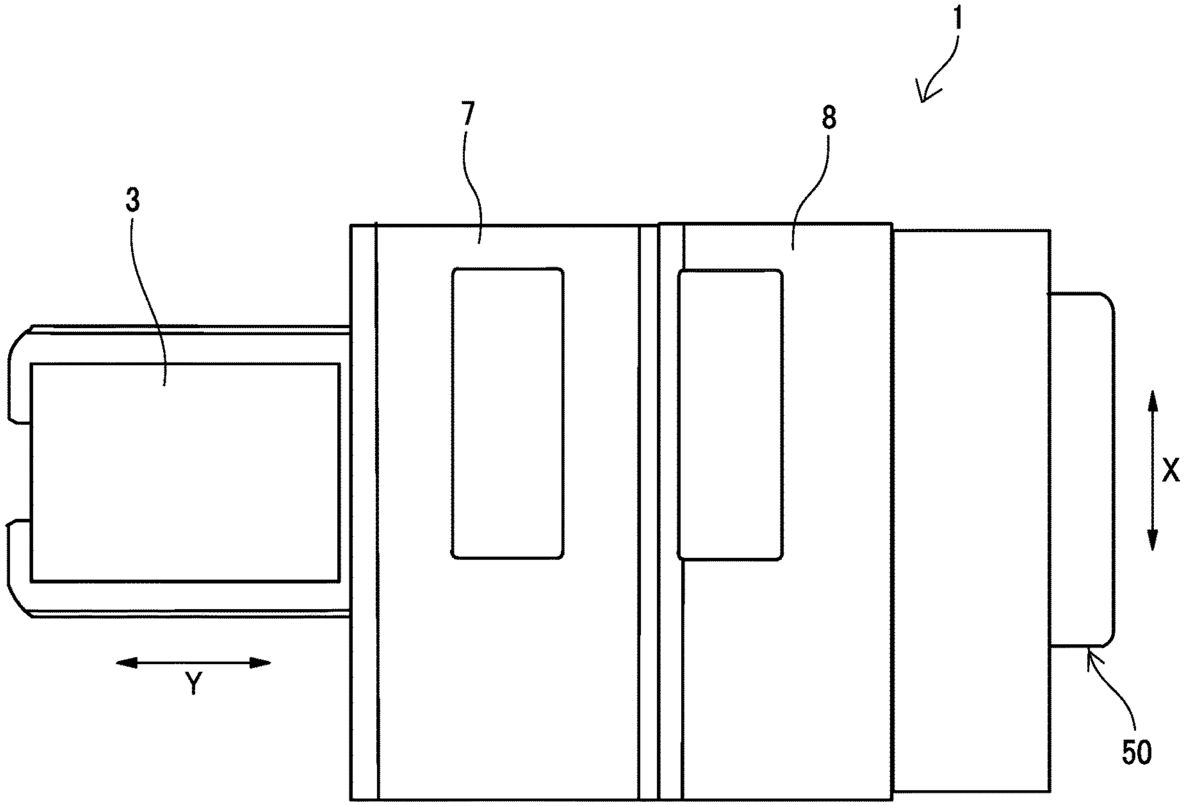
FIG. 2 is a plan view of the printer of FIG. 1 with the covers closed.
Figure 3:
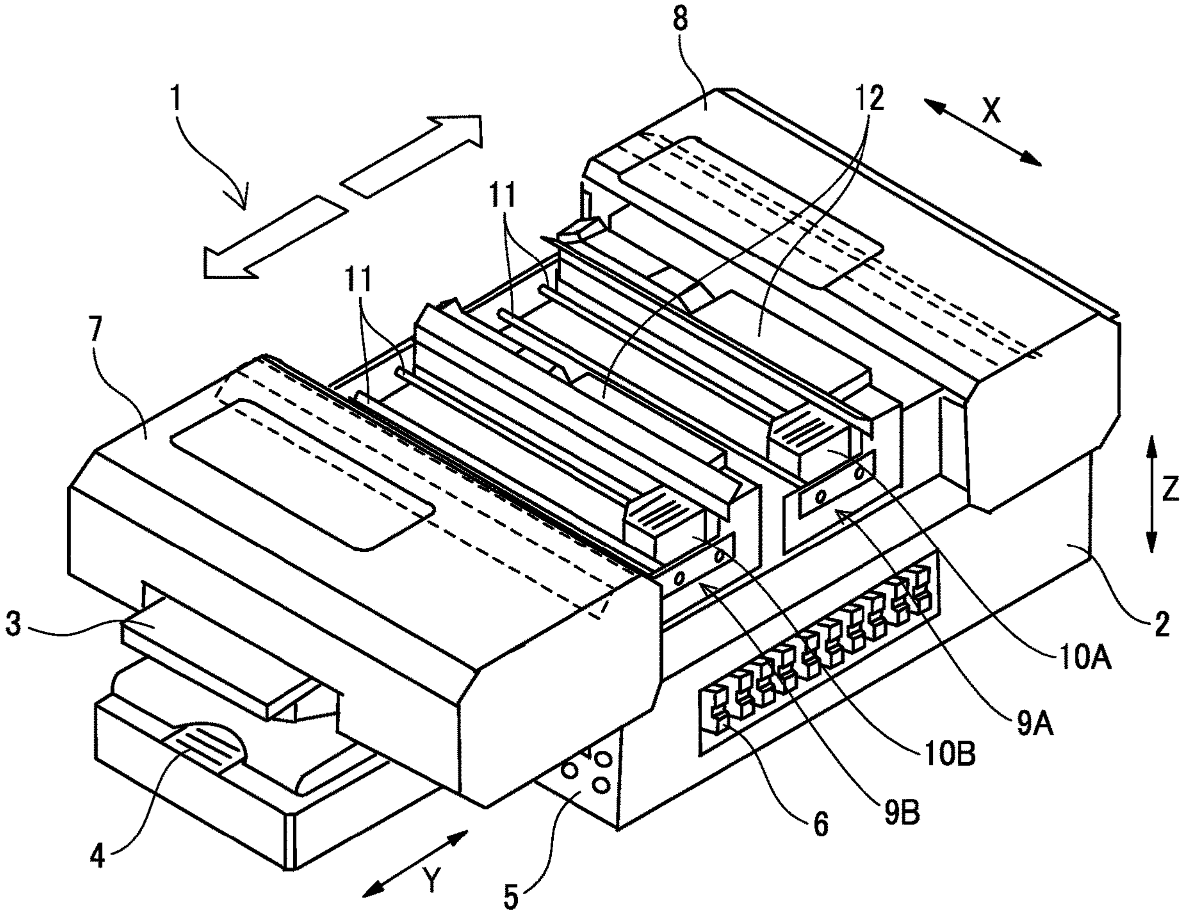
FIG. 3 is a perspective view of the printer of FIG. 1 with the covers open.
Figure 4:
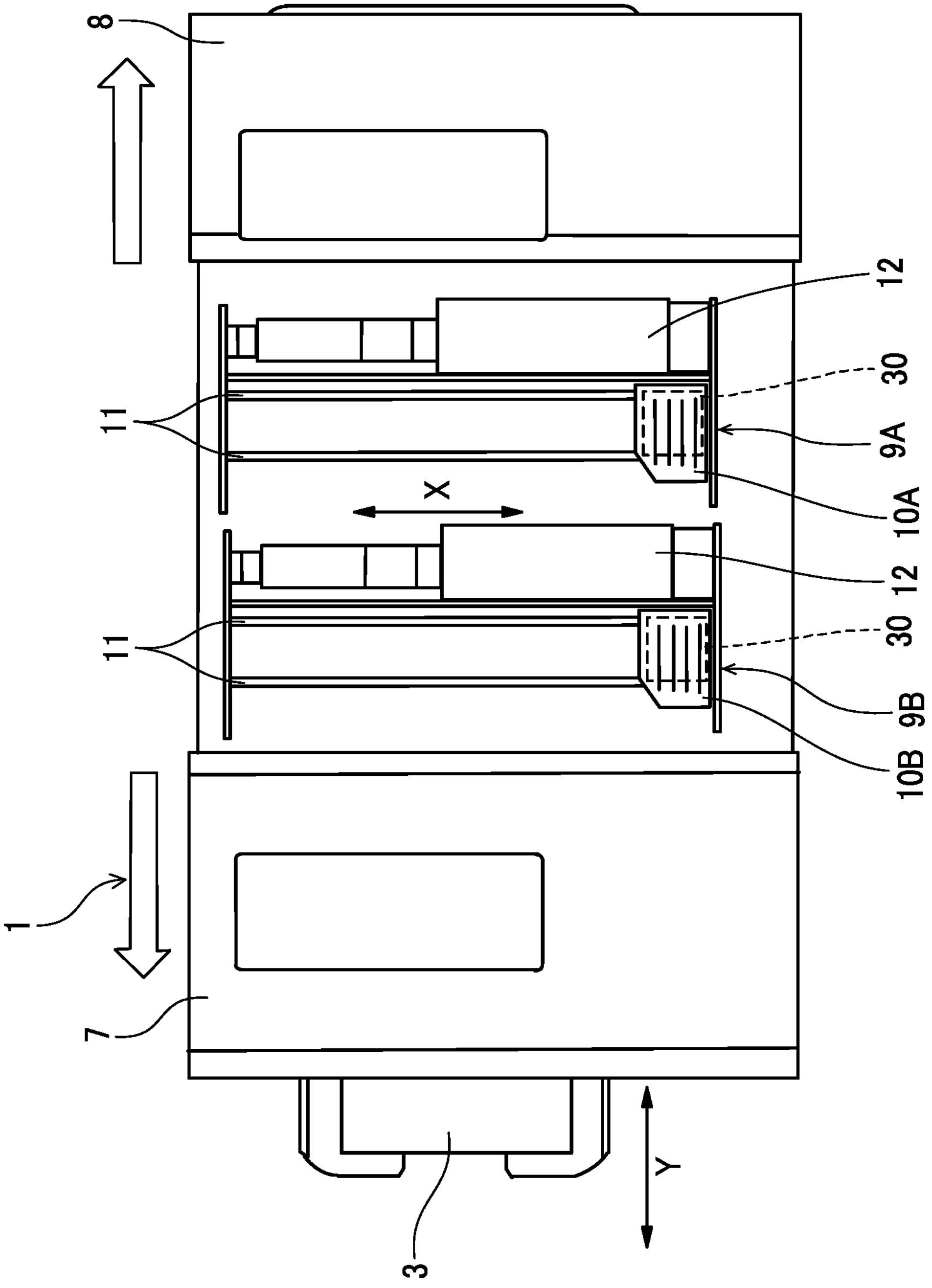
FIG. 4 is a plan view of the printer of FIG. 1 with the covers open.

Embodiments of the present disclosure are described below referring to the accompanying drawings. A printer as a liquid discharge apparatus according to a first embodiment of the present disclosure is described referring to FIGS. 1 to 4. FIG. 1 is a perspective view of the printer with covers closed. FIG. 2 is a plan view of the printer with the covers closed. FIG. 3 is a perspective view of the printer with the covers open. FIG. 4 is a plan view of the printer with the covers open.

In the present embodiment, a direction (main scanning direction) X in FIG. 1 is a transverse direction of the printer and a moving direction of a head, a direction (sub-scanning direction orthogonal to the main scanning direction) Y is a front-rear direction of the printer and a medium conveyance direction, and a direction Z is a vertical direction. The direction X and the direction Y are parallel to a surface, onto which liquid is discharged, of a medium on a stage, but may have some error. The directions X, Y, and Z are orthogonal to each other.

A printer 1 according to the present embodiment includes a stage 3 that is movable in the direction Y in a housing 2. The stage 3 is mounted on a guide rail 4 extending in the direction Y. An operation panel 5 is disposed on a front face of the housing 2. A liquid cartridge 6 is detachably attached to a side face of the housing 2. A front cover 7 and a rear cover 8 as covers are disposed over the housing 2.

The stage 3 has a flat upper face on which the medium is placed. The upper face of the stage 3 is parallel to the direction X and the direction Y. The stage 3 moves on the guide rail 4 to reciprocate in the direction Y (both the front direction and the rear direction). The stage 3 is movable up and down in the direction Z to adjust the height of the medium placed on the stage 3.

The front cover 7 and the rear cover 8 are movable in the direction Y (both the front direction and the rear direction). In FIG. 1, the front cover 7 has been moved backward and the rear cover 8 has been moved forward to close the front cover 7 and the rear cover 8. On the other hand, in FIG. 3, the front cover 7 has been moved forward and the rear cover 8 has been moved backward to open the front cover 7 and the rear cover 8.

As described above, the front cover 7 and the rear cover 8 are slidably opened and closed. As a result, the occupied space of printer 1, including an opening and closing space of the front cover 7 and the rear cover 8, can be reduced as compared with a configuration in which a front cover and a rear cover are opened and closed, for example, in the vertical direction. The front cover 7 and the rear cover 8 have openings at both ends in the front-rear direction. When the front cover 7 and the rear cover 8 are closed, the front cover 7 and the rear cover 8 are continuously arranged in the front-rear direction.

An apparatus body 50 of the printer 1 includes the housing 2 and two liquid discharge units 9 (9A and 9B) provided on the housing 2. In the present embodiment, in particular, the apparatus body 50 is a portion of the printer 1 except the front cover 7 and the rear cover 8. The front cover 7 and the rear cover 8 are slidable in the direction Y relative to the apparatus body 50.

When the front cover 7 and the rear cover 8 are opened, the liquid discharge units 9 in the printer 1 are open to the outside. Since the liquid discharge units 9 are open to the outside, a head maintenance device 30, a head, and the periphery of the head can be cleaned, or a carriage can be replaced.

The front cover 7 and the rear cover 8 are closed during image formation. Thus, the liquid discharge units 9B and 9A are covered with the front cover 7 or the rear cover 8. Operating units such as a carriage of the liquid discharge units 9A and 9B are no longer accessible from the outside.

Since the liquid discharge units 9B and 9A are disposed in a space closed with the front cover 7 or the rear cover 8, mist can be prevented from being scattered to the surrounding area during a liquid discharge operation, an airflow can be circulated in the space closed with the front cover 7 or the rear cover 8 by fans provided in the liquid discharge units 9B and 9A, and generated mist can be circulated and collected in the space closed with the front cover 7 or the rear cover 8.

The printer 1 of the present embodiment includes the two liquid discharge units 9A and 9B disposed in the direction Y. The liquid discharge unit 9A discharges a pretreatment liquid. The liquid discharge unit 9B discharges, for example, a color ink and a white ink. The liquids discharged by the liquid discharge units 9A and 9B are not limited to the above-described liquids, and any one of a color ink (color liquid), a white ink (white liquid), and a pretreatment liquid may be discharged. In particular, when the medium is cloth, it is preferable to apply the pretreatment liquid before image formation with ink, and hence one of the liquid discharge units preferably discharges the pretreatment liquid.

The liquid discharge units 9A and 9B, which have the same configuration, each include a carriage 10A/10B, a guide rod 11, an electrical portion 12 including a substrate and an electrical cover, and a head maintenance device 30.

The guide rod 11 extends in the direction X. The carriage 10 is movable in the direction X along the guide rod 11. The carriage 10 includes multiple liquid discharge heads. The head maintenance device 30 is located outside a liquid discharge area on one side in the left-right direction, at a position facing the guide rod 11.

The head maintenance device 30 includes, for example, a wiping device according to embodiments of the present disclosure that cleans a nozzle surface of the liquid discharge head and a suction mechanism that sucks the nozzle surface.

An outline of an image forming process on a medium by the liquid discharge units 9 is described below.

A medium is placed on the stage 3. The stage 3 is moved along the guide rail 4 and is conveyed to the rear side of the printer 1. The pretreatment liquid is applied to the medium by the liquid discharge unit 9A. Specifically, the pretreatment liquid is applied to across the medium in the direction X from the nozzle located on a head that discharges liquid, which is mounted on the first carriage 10A, while the first carriage 10 is moved along the guide rod 11 in the direction X. This operation is repeated at each position in the direction Y to apply the pretreatment liquid to the medium.

Then, the stage 3 is moved forward in the direction Y, and liquids of respective colors are discharged onto the medium by a head mounted on the second carriage 10B of the liquid discharge unit 9B in a similar manner. For printing in white on a medium, first, white ink is discharged from a head mounted on the liquid discharge unit 9B. Then, the stage 3 is moved to the rear side of the liquid discharge unit 9B, and colored liquid is discharged onto the medium from a head mounted on the liquid discharge unit 9B. Thus, an image can be formed on the medium.

Figure 5:
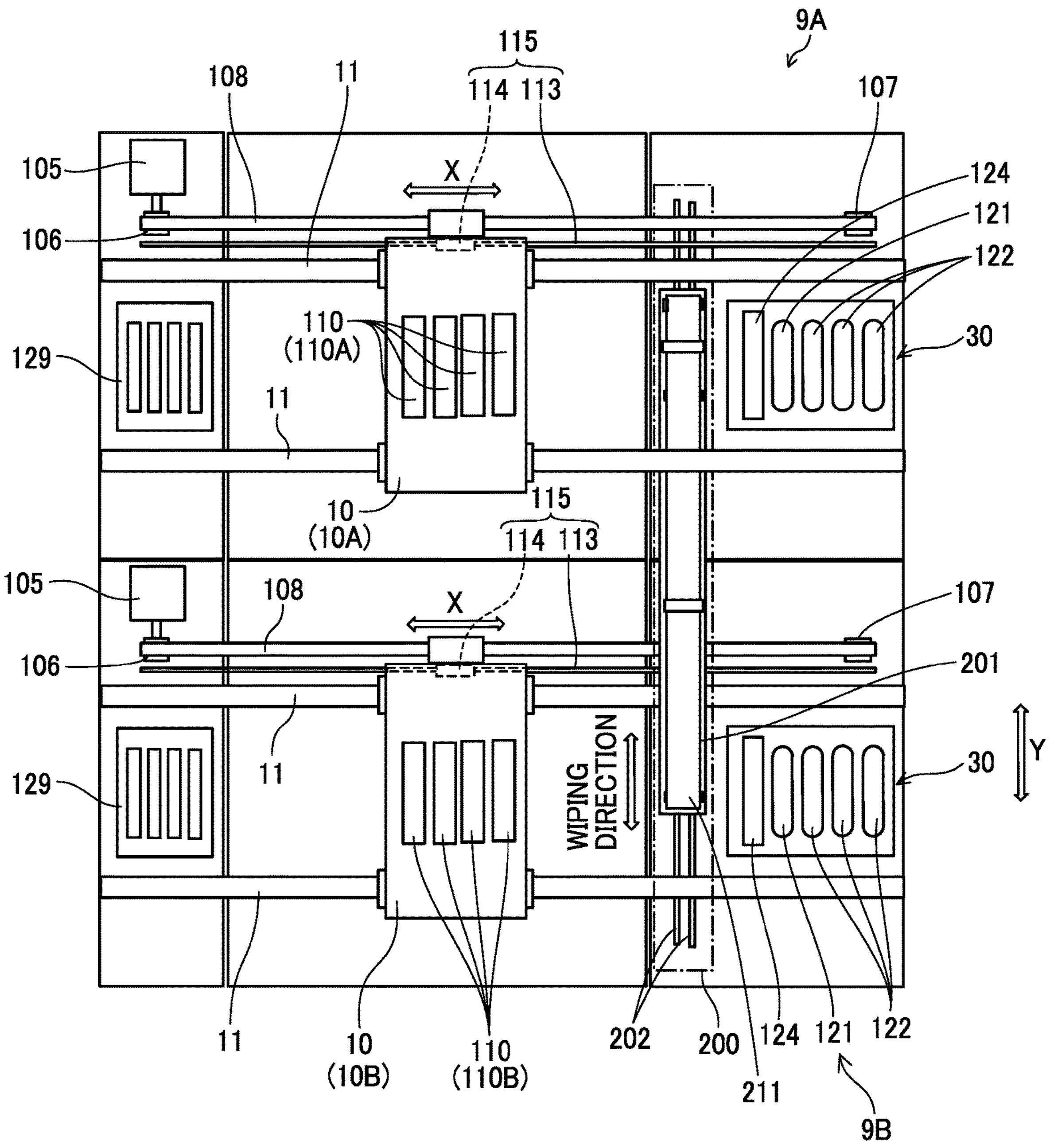
FIG. 5 is a plan view of liquid discharge units according to an embodiment of the present disclosure.

An example of the liquid discharge units of the printer according to the present embodiment is described below referring to FIG. 5. FIG. 5 is a plan view of the liquid discharge units.

As described above, the liquid discharge units 9 (9A and 9B) each include the carriage 10 that is held by two guide rods 11 bridged between left and right side plates so as to reciprocate in the main scanning direction X. The carriage 10 is reciprocated in the main scanning direction X by a main scanning motor 105 via a timing belt 108 looped around a driving pulley 106 and a driven pulley 107.

The carriage 10 includes four liquid discharge heads 110, which are referred to simply as a head or heads.

An encoder scale 113 having a predetermined pattern is bridged between both side plates in the main scanning direction X. The carriage 10 is provided with an encoder sensor 114 including a transmissive photosensor that reads the pattern of the encoder scale 113. The encoder scale 113 and the encoder sensor 114 define a linear encoder (main scanning encoder) 115 that detects movement of the carriage 10.

The head maintenance device 30, which is a maintenance and recovery mechanism that maintains and recovers the head 110, is disposed on one side of the range of movement of the carriage 10 in the main scanning direction X. A dummy discharge receptacle 129 is disposed on the other side of the range of movement of the carriage 10 in the main scanning direction.

The head maintenance devices 30 each include, for example, a suction cap 121, three moisturizing caps 122, and an idle discharge receiver 124. The suction cap 121 also serves as one moisturizing cap. The suction cap 121 and the moisturizing caps 122 cap nozzle surfaces 111 (faces having nozzles) of the heads 110.

The wiping device 200 according to the first embodiment of the disclosure is disposed to extend over the two liquid discharge units 9A and 9B.

The wiping device 200 includes a web cartridge 201, a guide rail 202, and a drive mechanism. The web cartridge 201 includes a web 211 made of cloth or nonwoven fabric. The guide rail 202 guides the movement of the web cartridge 201 in a wiping direction. The drive mechanism moves the web cartridge 201 in the wiping direction. The web cartridge 201 may be mounted on the guide rail 202 via a cartridge holder, or may be directly mounted on the guide rail 202.

In the printer 1, when printing is performed on a fabric, the stage 3 is moved out of the apparatus body 50. When a fabric is placed on the stage 3 and a print start is instructed, the stage 3 is retracted into the apparatus body 50. Intermittent movement of the stage 3 in the sub-scanning direction Y, movement of the carriage 10 in the main scanning direction X, and discharge of liquid of a certain color from a head 110 onto the stopped fabric are repeated to print a certain image on the fabric.

To maintain and recover the head 110, the head 110 is moved to a position above the web cartridge 201, and the web cartridge 201 is moved in the wiping direction (the same as the direction Y) while the web 211 is in contact with the nozzle surface of the head 110. Thus, contaminations such as residual liquid, a thickened or fixed object of the liquid, and dust adhering to the nozzle surface of the head 110 are wiped off.

In the present embodiment, for example, the carriage 10 of the liquid discharge unit 9A is referred to as a first carriage 10A, and the head 110 mounted on the first carriage 10A is referred to as a first head 110A, which discharges a first liquid. The carriage 10 of the liquid discharge unit 9B is referred to as a second carriage 10B, and the head 110 mounted on the second carriage 10B is referred to as a second head 110B, which discharges a second liquid different from the first liquid. In other words, in the present embodiment, the first head 110A and the second head 110B are mounted on the first carriage 10A and the second carriage 10B which are different from each other.

Figure 6:
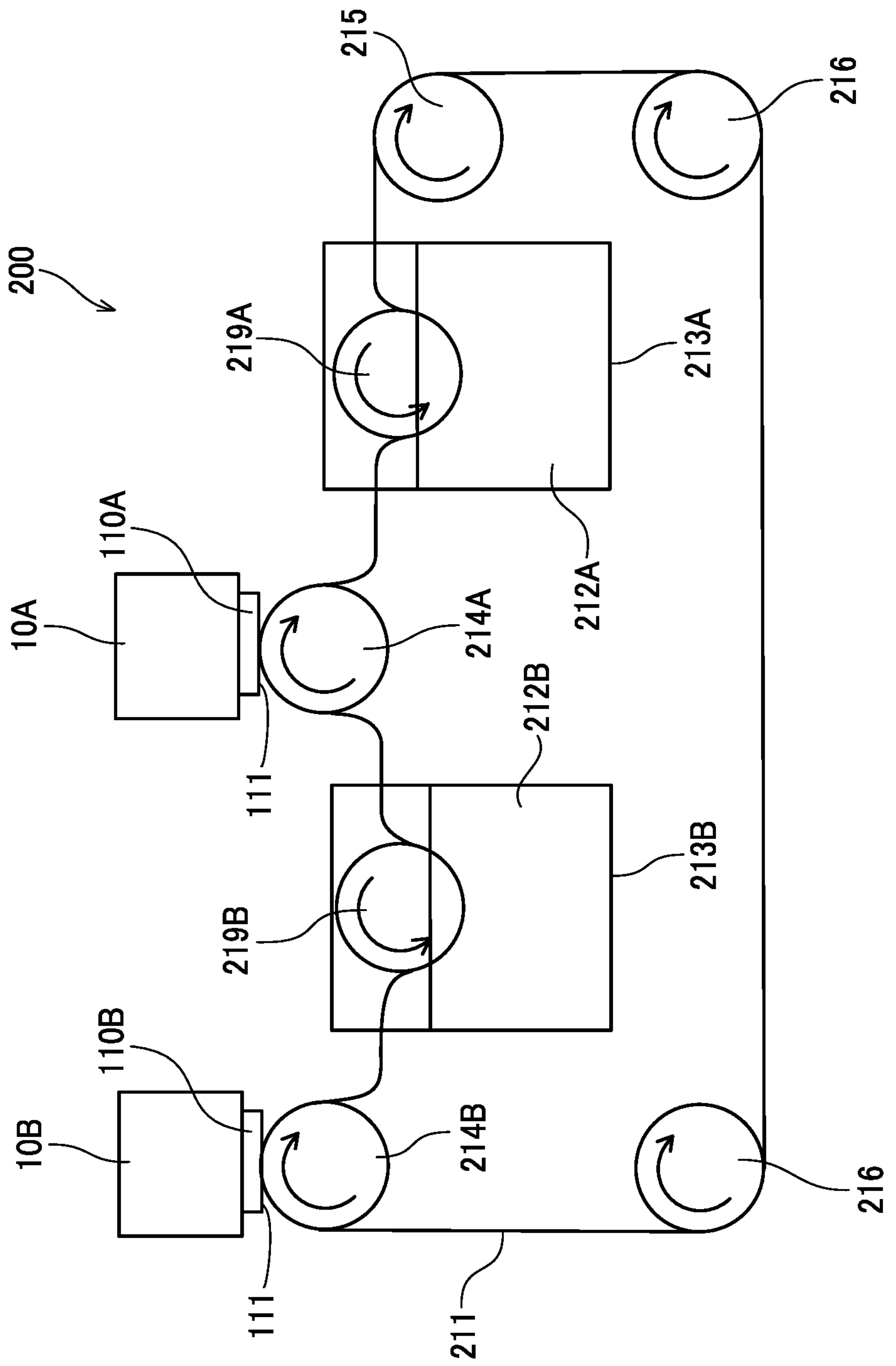
FIG. 6 is a sectional view of a portion of a wiping device according to the first embodiment.
Figure 7:
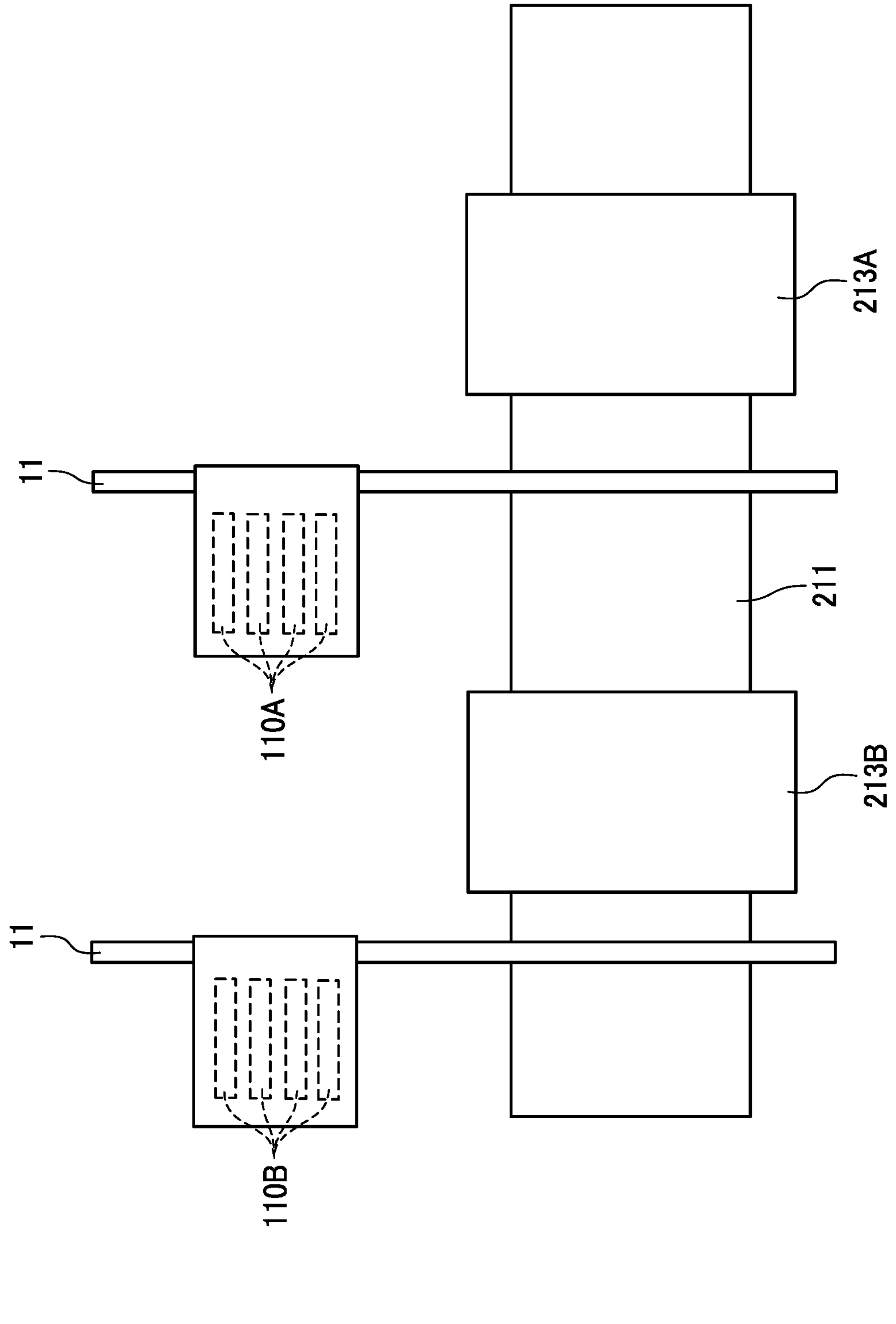
FIG. 7 is a plan view of a portion of the wiping device of FIG. 6.

The wiping device according to the first embodiment of the present disclosure is described below referring to FIGS. 6 and 7. FIG. 6 is a sectional view of a part of the wiping device, and FIG. 7 is a plan view of the part of the wiping device in FIG. 6.

The wiping device 200 includes an endless web (long wiping member) 211 serving as a wiping member (or a wiper), a first cleaning liquid tank, and a second liquid tank in a housing (cartridge case) of the web cartridge 201. The first cleaning liquid tank and the second liquid tank cleans the web 211.

The web 211 is a wiping member that wipes the nozzle surface 111 of the first head 110A and the nozzle surface 111 of the second head 110B, which serve as wiping target objects.

The first cleaning liquid tank 213A contains a first cleaning liquid 212A for cleaning the web 211 with the first liquid attached from the first head 110A. In other words, the first cleaning liquid tank 213A contains a first cleaning liquid 212A to remove the first liquid attached to the web (or the wiper). The second cleaning liquid tank 213B contains a second cleaning liquid 212B for cleaning the web 211 with the second liquid adhering from the second head 110B. In other words, the second cleaning liquid tank 213B contains a second cleaning liquid 212B to remove the second liquid attached to the web (or the wiper).

The first cleaning liquid 212A and the second cleaning liquid 212B preferably contain water and glycerin, and may contain other organic solvents, surfactants, and pH-adjusting agents as appropriate. Including water in the cleaning liquid minimizes environmental impact. The addition of glycerin reduces volatility and enhances its cleaning power. It is particularly preferable for the cleaning liquids 212A and 212B to contain water at a concentration of from 50% to 65% by weight, and glycerin at a concentration of from 15% to 20% by weight.

The web 211 is looped around the pressing rollers 214A and 214B, the driving roller 215, the guide roller 216, and the immersion rollers 219A and 219B, allowing the web 211 to move in a circuit while partially immersed in the first cleaning liquid 212A and the second cleaning liquid 212B.

The pressing roller 214A is located at a height to elastically contact the nozzle surface 111 of the first head 110A. The pressing roller 214B is located at a height to elastically contact the nozzle surface 111 of the second head 110B.

The first carriage 10A is moved to position the nozzle surface 111 of the first head 110A at the wiping position of the wiping device 200 to wipe the nozzle surface 111 of the first head 110A by the wiping device 200.

Then, the web cartridge 201 is moved in the wiping direction while the web 211 is pressed against the nozzle surface 111 of the first head 110A by the pressing roller 214A. The movement of the web cartridge 201 causes the web 211 to move in the wiping direction, wiping the nozzle surface 111 of the first head 110A and removing any dirt from the nozzle surface 111.

After wiping the nozzle surface 111 of the first head 110A, the web 211 is moved in a circuit by the rotation of the driving roller 215, which is powered by a drive source. Through this wiping action, the portion of the web attached with the first liquid is moved into the first cleaning liquid tank 213A.

The web 211 moved into the first cleaning liquid tank 213A is guided by the immersion roller 219A as it passes through the first cleaning liquid 221A in the first cleaning liquid tank 213A, dissolving and removing any contaminants transferred from the nozzle surface 111 of the first head 110A.

In addition, the second carriage 10B is moved to position the nozzle surface 111 of the second head 110B at the wiping position of the wiping device 200 to wipe the nozzle surface 111 of the second head 110B by the wiping device 200.

Then, the web cartridge 201 is moved in the wiping direction while the web 211 is pressed against the nozzle surface 111 of the second head 110B by the pressing roller 214B. The movement of the web cartridge 201 causes the web 211 to move in the wiping direction, wiping the nozzle surface 111 of the second head 110B and removing any dirt from the nozzle surface 111.

After wiping the nozzle surface 111 of the second head 110B, the web 211 is moved in a circuit by the rotation of the driving roller 215, which is powered by the drive source. Through this wiping action, the portion of the web attached with the second liquid is moved into the second cleaning liquid tank 213B.

The web 211 moved into the second cleaning liquid tank 213B is guided by the immersion roller 219B as it passes through the second cleaning liquid 212B in the second cleaning liquid tank 213B, dissolving and removing any contaminants transferred from the nozzle surface 111 of the second head 110B.

In the present embodiment, both the first head 110A and the second head 110B are moved to the wiping positions to wipe the nozzle surfaces 111 of the first head 110A and the second head 110B.

As described above, a portion of the web attached with the first liquid and another portion of the web attached with the second liquid are cleaned with different cleaning liquids in separate cleaning liquid tanks. In other words, the first liquid attached to the web and the second liquid attached to the web are removed by different cleaning liquids in separate cleaning liquid tanks. Thus, by wiping the heads that discharge the first liquids and the second liquids with a common web, this method prevents the mixing (or contamination) of different liquids in the cleaning liquids, enhancing the cleaning efficiency.

Possible combinations of the first liquid and the second liquid include, for example, a treatment liquid as the first liquid and a white liquid as the second; a treatment liquid as the first liquid and a color liquid as the second liquid; or a white liquid as the first liquid and a color liquid as the second liquid.

Figure 8:
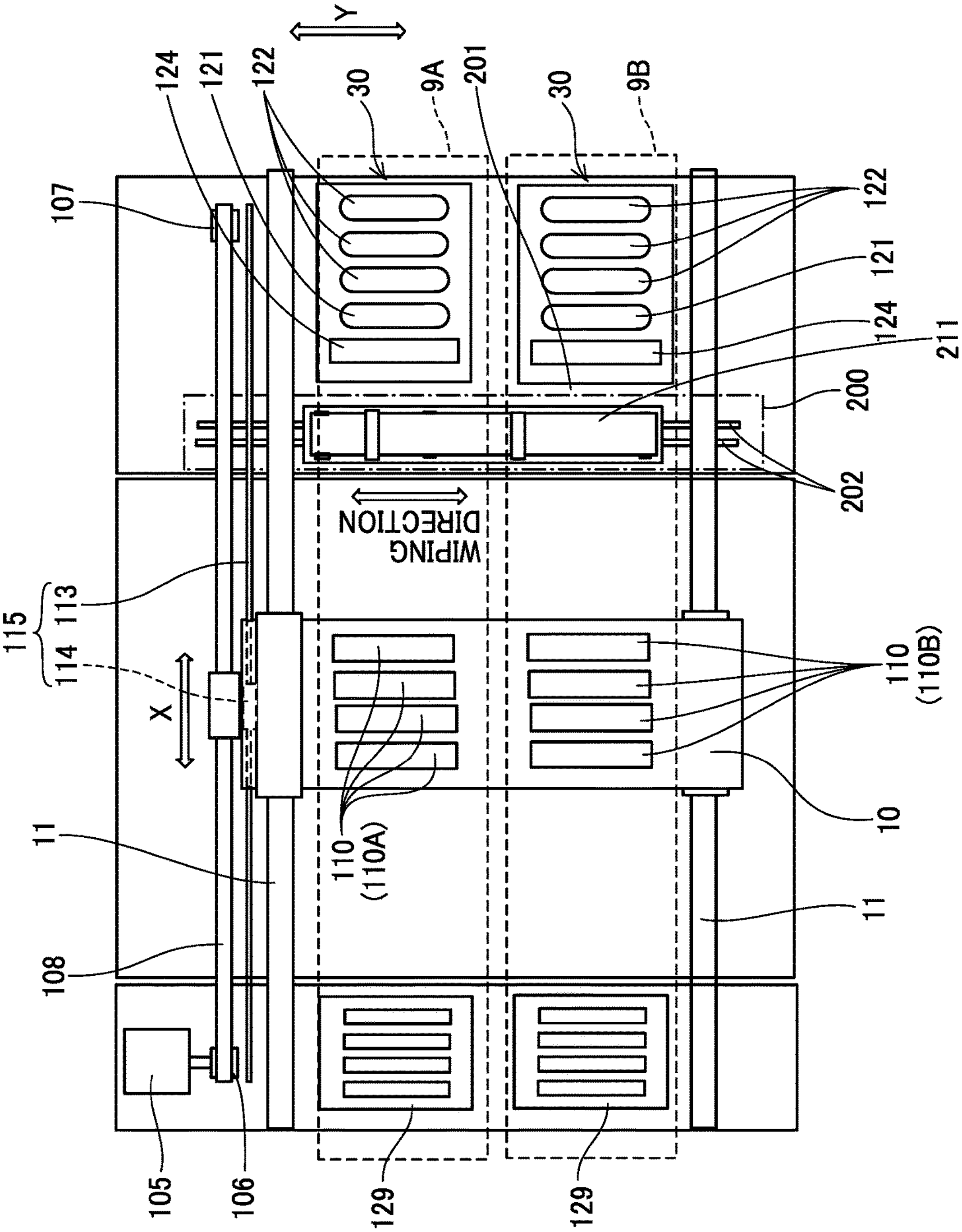
FIG. 8 is a plan view of liquid discharge units included in a printer as a liquid discharge apparatus according to a second embodiment of the present disclosure.

With reference to FIG. 8, liquid discharge units included in a printer as a liquid discharge apparatus according to the second embodiment of the present disclosure are described below. FIG. 8 is a plan view of the liquid discharge units.

The liquid discharge units 9 include one common carriage 10 mounted with first heads 110A and second head 110B. In this configuration, one scanning mechanism to scan the carriage 10 is included the liquid discharge apparatus according to the present embodiment.

In the present embodiment, since the first heads 110A and the second heads 110B share the carriage 10, the carriage 10 is moved to a position for the wiping by the wiping device, allowing the wiping of both the first heads 110A and the second heads 110B.

Figure 9:
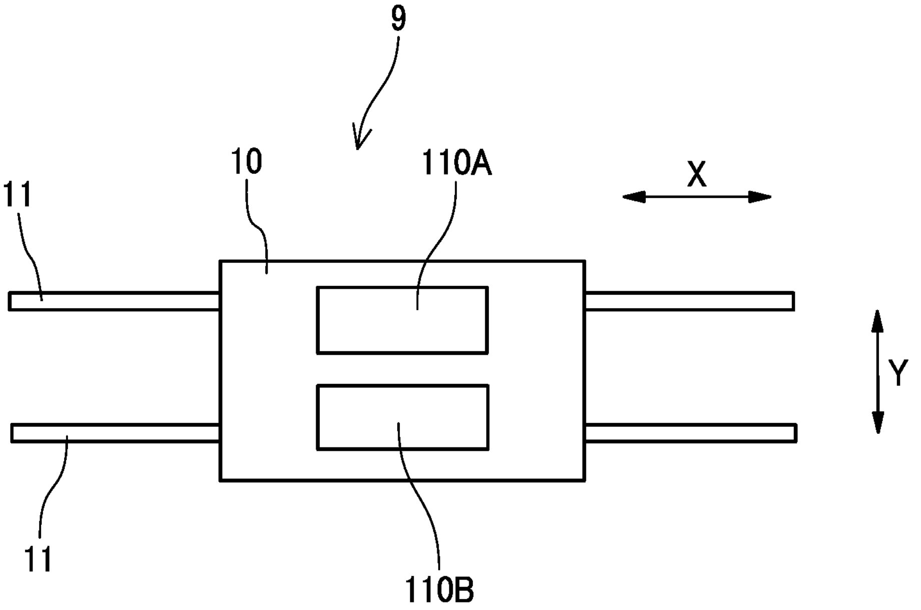
FIG. 9 is a plan view of a carriage as viewed from nozzle surfaces of heads according to a third embodiment of the present disclosure.

A third embodiment of the present disclosure is described with reference to FIG. 9. FIG. 9 is a plan view of a carriage in view from nozzle surfaces of heads according to the sixth embodiment.

In the present embodiment, a carriage 10 includes a first head 110A that discharges a first liquid and a second head 110B that discharges a second liquid. The first head 110A and the second head 110B have the longitudinal directions in a direction extending in the main scanning direction X. In this case, for example, the white or colored liquid is ejected by the second head 110B, and the preprocessing liquid is ejected by the first head 110A.

Figure 10:
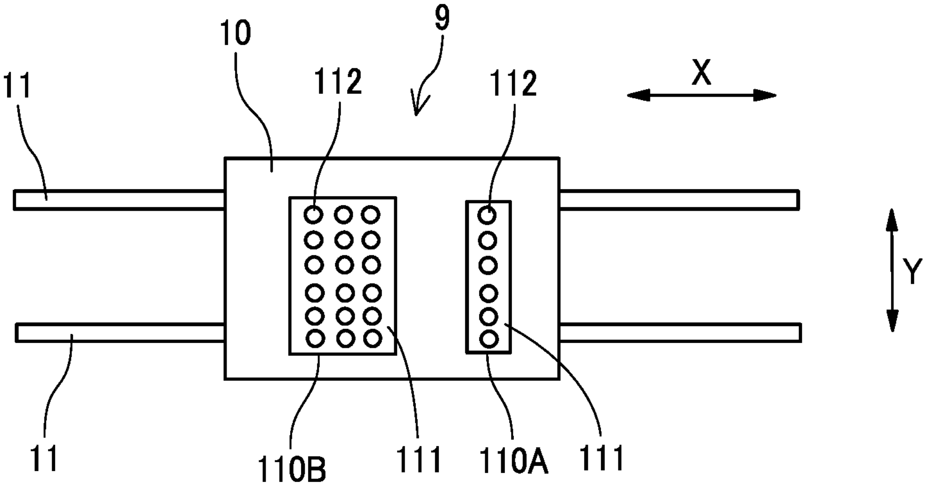
FIG. 10 is a plan view of a carriage as viewed from nozzle surfaces of heads according to a fourth embodiment of the present disclosure.

The waste liquid tube 103 according to a fourth embodiment of the present disclosure is described with reference to FIG. 10. FIG. 10 is a plan view of the carriage in the embodiment, as viewed from the nozzle surface side of the head.

In the present embodiment, a carriage 10 includes a first head 110A and a second head 110B. The first head 110A has multiple discharge port arrays each having multiple discharge ports 112 through which a first liquid is discharged. The second head 110B has a discharge port array having multiple discharge ports 112 through which a second liquid is discharged.

The first head 110A and the second head 110B have the longitudinal directions in a direction extending in the sub-scanning direction Y orthogonal to the main scanning direction X. In this case, for example, the white or colored liquid is ejected by the second head 110B, and the preprocessing liquid is ejected by the first head 110A.

The above-described embodiments can be combined with each other within an allowable range.

In any of the embodiments of the disclosure, the liquid to be discharged is not limited to a particular liquid as long as the liquid has a viscosity or surface tension to be discharged from a head (liquid discharge head). However, preferably, the viscosity of the liquid is not greater than 30 mPas under ordinary temperature and ordinary pressure or by heating or cooling. Examples of the liquid to be discharged include a solution, a suspension, or an emulsion including, for example, a solvent, such as water or an organic solvent; a colorant, such as dye or pigment; a functional material, such as a polymerizable compound, a resin, or a surfactant; a biocompatible material, such as deoxyribonucleic acid (DNA), amino acid, protein, or calcium; or an edible material, such as a natural colorant. Such a solution, a suspension, or an emulsion can be used for, e.g., an inkjet ink; a surface treatment liquid; a liquid for forming an electronic element component, a light-emitting element component, or an electronic circuit resist pattern; or a material solution for three-dimensional fabrication.

Examples of an energy source for generating energy to discharge liquid include a piezoelectric actuator (a laminated piezoelectric element or a thin-film piezoelectric element), a thermal actuator that employs a thermoelectric transducer element, such as a thermal resistor, and an electrostatic actuator including a diaphragm and a counter electrode.

The term "liquid discharge apparatus" used herein represents an apparatus including the liquid discharge head to drive the liquid discharge head to discharge liquid. The liquid discharge apparatus may be, for example, an apparatus capable of discharging a liquid to a material to which liquid can adhere or an apparatus to discharge liquid toward gas or into liquid.

The liquid discharge apparatus may include devices to feed, convey, and eject the material on which liquid can adhere. The liquid discharge apparatus may further include a pretreatment apparatus to coat a treatment liquid onto the material, and a post-treatment apparatus to coat a treatment liquid onto the material, onto which the liquid has been discharged.

The "liquid discharge apparatus" may be, for example, an image forming apparatus to form an image on a sheet by discharging ink, or a three-dimensional fabrication apparatus to discharge a fabrication liquid to a powder layer in which a powder material is formed in a layer to form a three-dimensional fabrication object.

The "liquid discharge apparatus" is not limited to an apparatus to discharge liquid to visualize meaningful images, such as letters or figures. For example, the liquid discharge apparatus may be an apparatus to form meaningless images, such as meaningless patterns, or fabricate three-dimensional images.

The above-described term "medium onto which liquid can adhere" represents a medium on which liquid is at least temporarily adhered, a medium on which liquid is adhered and fixed, or a medium into which liquid adheres and permeates. Specific examples of the "medium onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "medium onto which liquid can adhere" includes any medium to which liquid adheres, unless otherwise specified.

Examples of materials of the "medium onto which liquid can adhere" include any materials to which liquid can adhere even temporarily, such as paper, thread, fiber, fabric, leather, metal, plastic, glass, wood, and ceramic.

The "liquid discharge apparatus" may be an apparatus to relatively move the liquid discharge head and a material onto which liquid can adhere. However, the liquid discharge apparatus is not limited to such an apparatus. For example, the liquid discharge apparatus may be a serial head apparatus that moves the head or a line head apparatus that does not move the head.

Examples of the "liquid discharge apparatus" further include a treatment liquid applying apparatus that discharges a treatment liquid onto a sheet to apply the treatment liquid to the surface of the sheet, for reforming the surface of the sheet; and an injection granulation apparatus that injects a composition liquid, in which a raw material is dispersed in a solution, through a nozzle to granulate fine particles of the raw material.

Aspects of the disclosure are, for example, as follows.

Aspect 1

A wiping device includes: a wiper to wipe a first head to discharge a first liquid with a first portion of the wiper; and wipe a second head to discharge a second liquid different from the first liquid with a second portion of the wiper different from the first portion; a first cleaning tank containing a first cleaning liquid to remove the first liquid attached to the first portion of the wiper; and a second cleaning tank containing a second cleaning liquid to remove the second liquid attached to the second portion of the wiper.

Aspect 2

In the wiping device according to Aspect 1, the first liquid has a pretreatment liquid, and the second liquid has a white liquid.

Aspect 3 In the wiping device according to Aspect 1, the first liquid has a pretreatment liquid, and the second liquid has a color liquid.

Aspect 4

In the wiping device according to claim 1, the first liquid has a white liquid, and the second liquid has a color liquid.

Aspect 5

In the wiping device according to any one of Aspect 1 to 4, each of the cleaning liquid (e.g., the first cleaning liquid and the second cleaning liquid) contains water and glycerin.

Aspect 6

In the wiping device according to Aspect 5, each of the first cleaning liquid and the second cleaning liquid contains the water at a concentration of from 50% to 65% by weight and the glycerin at a concentration of from 15% to 20% by weight.

Aspect 7

A liquid discharge apparatus includes the first head to discharge the first liquid; the second head to discharge the second liquid; and the wiping device according to any one of Aspects 1 to 6.

Aspect 8

The liquid discharge apparatus according to Aspect 7, further includes a first carriage mounting the first head; and a second carriage mounting the second head, the second carriage different from the first carriage.

Aspect 9

The liquid discharge apparatus according to Aspect 7, further includes a carriage common between the first head and the second head (i.e., a carriage mounting both of the first head and the second head).

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A wiping device, comprising:

a wiper including:

a first portion to wipe a first head which discharges a first liquid; and a second portion to wipe a second head which discharges a second liquid different from the first liquid, the second portion different from the first portion;

a first cleaning tank containing a first cleaning liquid to remove the first liquid attached to the first portion of the wiper; and a second cleaning tank containing a second cleaning liquid to remove the second liquid attached to the second portion of the wiper.

2. The wiping device according to claim 1, wherein the first liquid has a pretreatment liquid, and the second liquid has a white liquid.

3. The wiping device according to claim 1, wherein the first liquid has a pretreatment liquid, and the second liquid has a color liquid.

4. The wiping device according to claim 1, wherein the first liquid has a white liquid, and the second liquid has a color liquid.

5. The wiping device according to claim 1, wherein each of the first cleaning liquid and the second cleaning liquid contains water and glycerin.

6. The wiping device according to claim 5, wherein each of the first cleaning liquid and the second cleaning liquid contains:

the water at a concentration of from 50% to 65% by weight; and the glycerin at a concentration of from 15% to 20% by weight.

7. A liquid discharge apparatus comprising:

the wiping device according to claim 1;

the first head; and the second head.

8. The liquid discharge apparatus according to claim 7, further comprising:

a first carriage mounting the first head; and a second carriage mounting the second head, the second carriage different from the first carriage.

9. The liquid discharge apparatus according to claim 7, further comprising a carriage mounting both of the first head and the second head.

* * * * *